(12) United States Patent
Harper

(10) Patent No.: US 7,136,210 B2
(45) Date of Patent: Nov. 14, 2006

(54) LIGHT MODULATOR

(75) Inventor: Steven L. Harper, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 77 days.

(21) Appl. No.: 10/971,432

(22) Filed: Oct. 21, 2004

(65) Prior Publication Data

US 2006/0087712 A1   Apr. 27, 2006

(51) Int. Cl.
*G02B 26/00* (2006.01)

(52) U.S. Cl. .................. 359/237; 359/242; 359/259

(58) Field of Classification Search ............. 359/237
See application file for complete search history.

(56) References Cited

U.S. PATENT DOCUMENTS

| 5,264,694 | A  |   | 11/1993 | Diehl et al.     |         |
|-----------|----|---|---------|------------------|---------|
| 5,414,465 | A  |   | 5/1995  | Kodama et al.    |         |
| 5,694,165 | A  |   | 12/1997 | Yamazaki et al.  |         |
| 5,760,832 | A  |   | 6/1998  | Yamanaka et al.  |         |
| 5,901,242 | A  |   | 5/1999  | Crane et al.     |         |
| 6,707,516 | B1 | * | 3/2004  | Johnson et al.   | 349/78  |
| 6,751,006 | B1 | * | 6/2004  | Zhou et al.      | 359/291 |
| 6,850,352 | B1 | * | 2/2005  | Childers         | 359/237 |
| 6,900,922 | B1 | * | 5/2005  | Aubuchon         | 359/292 |
| 6,940,646 | B1 | * | 9/2005  | Taniguchi et al. | 359/463 |
| 6,980,321 | B1 | * | 12/2005 | Ramanujan et al. | 358/1.2 |

* cited by examiner

Primary Examiner—Timothy Thompson

(57) ABSTRACT

One embodiment of a light modulator apparatus includes a first light modulator and a second light modulator diagonally offset from and in series with the first light modulator.

37 Claims, 2 Drawing Sheets

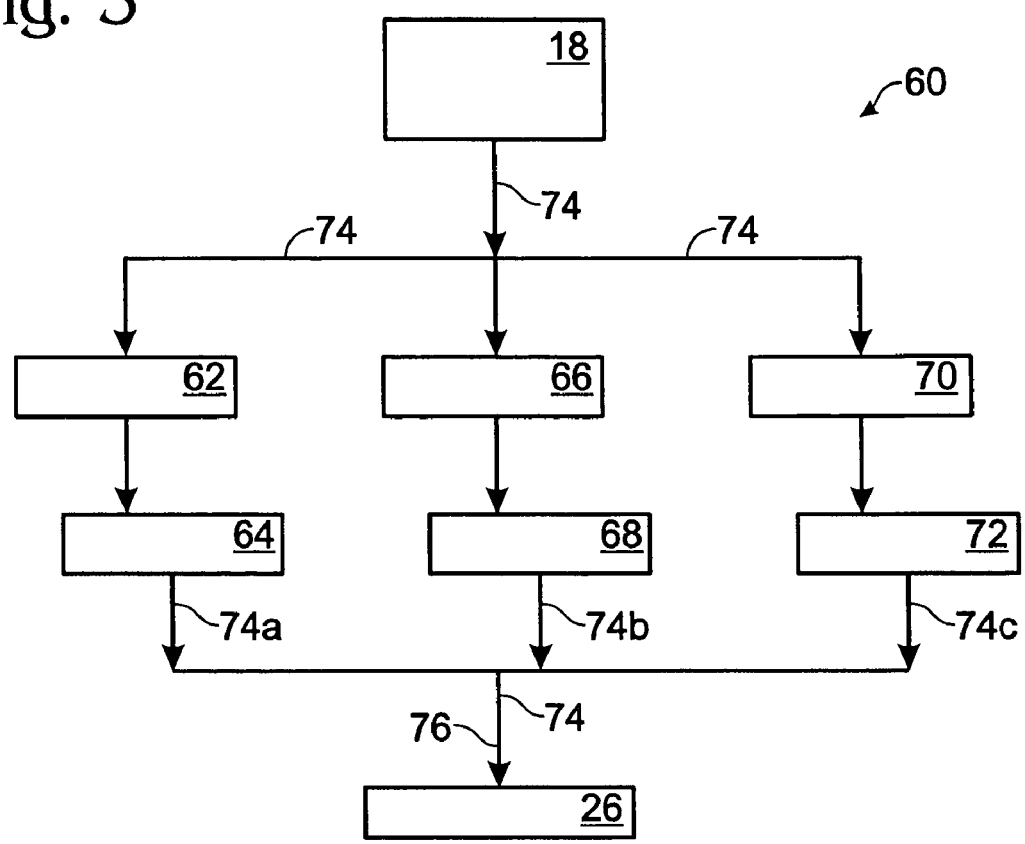

LIGHT MODULATOR

BACKGROUND

Image generation systems may emit light therefrom. Such systems may use a microdisplay or a light modulator built on a silicon chip, such as liquid crystal on silicon, micromirrors on silicon, or the like. Higher resolution may be desirable but may utilize larger and more expensive silicon chips. Higher intensity of emitted light may also be desirable. However, light generated by such systems may be rejected, i.e., not emitted from the system, by color wheels, ultra violet light filters, and infrared light filters. This rejected light may be dissipated as heat from the system by the use of cooling fans that may utilize additional power in the system and may generate undesirable noise.

SUMMARY

A process of producing an image includes providing a first light modulator and a second light modulator positioned in series and being offset from one another along an optical path. A first image produced by the first light modulator is simultaneously overlaid a second image produced by the second light modulator to produce a final image.

BRIEF DESCRIPTION OF THE DRAWINGS

FIG. 3 is a schematic view of one embodiment of a light modulator system including one embodiment of six light modulators which produce red, green and blue light without use of a color wheel.

DETAILED DESCRIPTION OF THE DRAWINGS

Figure 1:
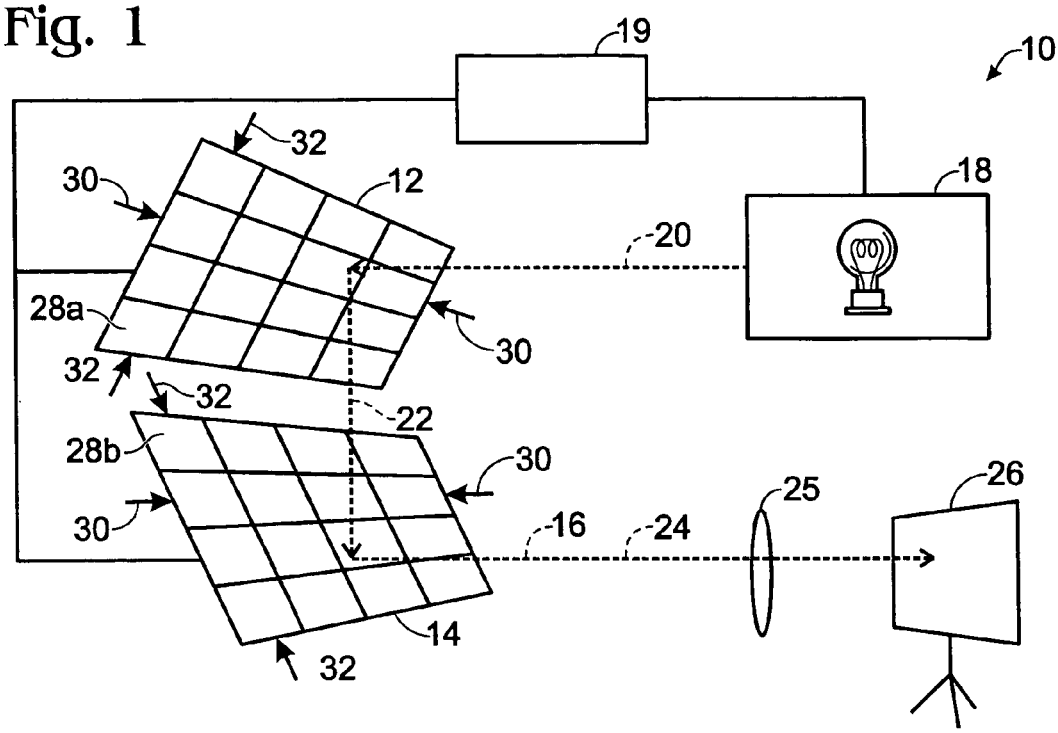
FIG. 1 is a schematic perspective view of one embodiment of a light modulator system including one embodiment of first and second light modulators positioned in series along an optical path.

FIG. 1 is a schematic perspective view of one embodiment of a light modulator system 10 including one embodiment of a first light modulator 12 and a second light modulator 14 positioned in series along an optical path 16. For purposes of this document, a "light modulator" may comprise any device that receives light and re-transmits various portions of the light received according to the influence of one or more applied electrical signals. In one embodiment, light modulators 12 and 14 may each comprise a spatial light modulator (SLM) that may comprise an array of individually addressable pixels positioned on a silicon substrate. In particular, the modulators may each comprise a binary modulator that may switch the pixels to either an "on" or an "off" state. In the "on" state the pixel may reflect light so as to form a light spot in an image and in an "off" state the pixel may not reflect light so as to form a dark spot in an image. Other light modulators, such as liquid crystal displays and interference based light modulators, may be utilized in other embodiments of the present invention.

An illumination source 18, which may be controlled by a computer 19, may produce light 20 that may be sent to first light modulator 12 along optical path 16. First light modulator 12 may modulate light 20 so as to produce an image 22 that may be sent to second light modulator 14 along optical path 16. Second light modulator 14 may modulate image 22 so as to produce a second image 24 that may be sent through a lens system 25 to a display 26, such as a front or a rear projection screen. Lens system 25 may comprise any number of separate lens elements or groups, such as a focusing lens or the like. Computer 19 may send first subframe data to first light modulator 12 and may send second subframe data, different from the first subframe data, to second light modulator 14. In this manner, each of series modulators 12 and 14 will modulate the light impinging on it in a different fashion, so as to produce final image 24 having a higher resolution than the resolution of either of light modulators 12 or 14. First and second light modulators 12 and 14, respectively, may be positioned in series along optical path 16 such that light 20 from illumination source 18 will first contact first light modulator 12, thereafter will contact second light modulator 14 and thereafter will be projected to screen 26. Accordingly, if either of series light modulators 12 or 14 of the embodiment shown is in an "off" condition, light will not be projected to screen 26. Similarly, if a component of either of light modulators 12 or 14, such as a pixel of either of light modulators 12 or 14, is in an off condition, light impinging on that particular component will not be projected to screen 26. Such a series arrangement of light modulators 12 and 14 is different from a parallel arrangement of modulators wherein if one modulator or a component thereof is in an "off" condition, the other modulator will still project light to a projection screen, such that the final image in such a parallel modulator arrangement may have half the intensity of an image projected when both parallel modulators are in the "on" condition. A series arrangement may be utilized in the exemplary embodiment because the series arrangement may allow an improved contrast ratio and/or a greater color saturation than a parallel arrangement of modulators.

Still referring to FIG. 1, first light modulator 12 and second light modulator 14 may have a plurality of individual light modulation components, such as pixels 28a and 28b, respectively, referred to generally as pixels 28. Accordingly, each of light modulators 12 and 14 may be referred to as pixel arrays. In one embodiment, first light modulator 12 and second light modulator 14 may each have a width 30 of approximately 900 to 1000 pixels and a height 32 of approximately 500 to 600 pixels. In particular, first light modulator 12 and second light modulator 14 may each have a width 30 of 960 pixels and a height 32 of 540 pixels. Of course, any number or arrangement of pixels may be utilized. In the schematic representation shown in FIG. 1, only a few pixels 28 are shown for ease of illustration. The individual pixels 28 may be positioned substantially adjacent each other such that there is substantially no inactive space between individual adjacent pixels. Accordingly, each of light modulators 12 and 14 may define a substantially continuous active area, i.e., a substantially continuous light emitting area across the light modulators.

The resolution of the modulators may be expressed as the number of pixels in the width and in the height of the pixel array. Accordingly, in the particular embodiment shown, modulators 12 and 14 may both be described as having a resolution of 960 by 540 pixels.

Each of pixels 28a of light modulator 12 and pixels 28b of light modulator 14 may be individually addressed to modulate or otherwise modify light impinging on the individual pixel 28. The pixels may be individually addressed by computer 19 or other control apparatus as will be understood by those skilled in the art. Modulators 12 and 14 may modulate a black and white image or a colored image. In one embodiment, alternating red, blue and green light may be modulated by light modulators 12 and 14 in rapid time sequence such that a full color image 24 is displayed on screen 26.

Figure 2:
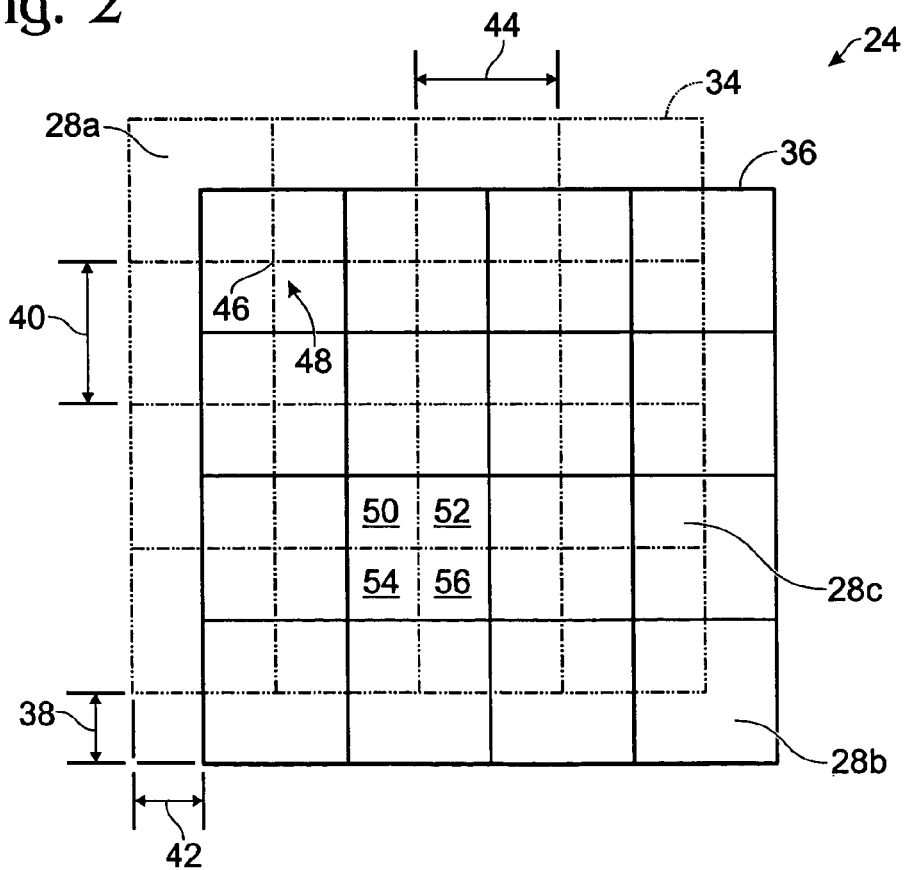
FIG. 2 is a schematic view of one embodiment of a final image produced by the first and second light modulators of FIG. 1.

FIG. 2 is a schematic view of one embodiment of the final image 24 produced by first and second light modulators 12 and 14 of FIG. 1. Final image 24 may include two components, an image 34 of first light modulator 12 comprised of a plurality of pixels 28a and an image 36 of second light modulator 14 comprised of a plurality of pixels 28b. Image 36 may be diagonally offset from image 34 such that image 36 is simultaneously vertically and horizontally offset from image 34. In particular, image 36 may be positioned vertically offset from image 34 by a distance approximately equal to half 38 a pixel height 40 and may be positioned horizontally offset from image 34 by a distance approximately equal to half 42 a pixel width 44. Accordingly, a corner 46 of a plurality of pixels 28a of first image 34 may be positioned substantially in a central region 48 within a corresponding pixel 28b of second image 36. Each of the apparent pixels 28c of final image 24, therefore, may appear to have four components or sub-pixel regions 50, 52, 54 and 56, except at the edge regions of the final image. Sub-pixel regions 50, 52, 54 and 56 may be referred to as the "pixels" of final image 24 wherein such pixels may be approximately one quarter the size of the pixels of light modulators 12 and 14. In other words, the first and second images 34 and 36 may be overlaid on one another to define projected image 24, wherein projected image 24 may have a number of apparent pixels greater than three times a number of pixels of first and second light modulators 12 and 14. For purposes of this document, "diagonal offset" means any degree of simultaneous horizontal and vertical offset of one light modulator with respect to a second light modulator along an optical path.

The individual image appearing in each of sub-pixel regions 50, 52, 54 and 56 may be individually controlled by controlling the corresponding pixel in both of light modulators 12 and 14. Accordingly, the number of apparent pixels of final image 24 may appear to the naked eye to be greater than three times the number of pixels of each of individual modulators 12 and 14. In particular, final image 24 may have an apparent number of pixels at least greater than 3.5 times the number of pixels of each of individual modulators 12 and 14, and substantially four times greater than the number of pixels of each of individual modulators 12 and 14. In one embodiment, the number of apparent pixels may be almost four times the resolution of the individual modulators 12 and 14 because the edge regions of the modulators may not overlap so that the edge region pixels may not contribute to the total number of smaller, apparent pixels of final image 24. For example, in one embodiment, final image 24 may have a resolution of 1920×1080, and light modulators 12 and 14 may each have a resolution of 960×540. System 10 of the present invention, therefore, may allow a high resolution initial image 20 to be projected onto projection screen 26 by utilizing two light modulators positioned in series and diagonally offset from one another, wherein the two individual light modulators each have a number of pixels approximately one-fourth the number of apparent pixels of the final image 24 or the initial image 20. Moreover, final image 24 may be created by first and second light modulators 12 and 14 while the modulators remain stationary, such that no mechanical gyration device is utilized. In other words, no movable mirrors or other movable mechanical hardware may be utilized in the light modulators of light modulation system 10 of the present invention. This may reduce the cost and increase the reliability of light modulation system 10 of the present invention.

One embodiment of the data that may be sent to each modulator will now be described. In particular, in one exemplary embodiment, four subframe data components may be sent to first modulator 12, such as data components A1, A2, A3 and A4, and four separate subframe data components may be sent to second modulator 14, such as data components B1, B2, B3 and B4. Components A1 and B1 may be different from one another and may be sent simultaneously to modulators 12 and 14, respectively. Similarly, A2 and B2 may be different from one another and may be sent simultaneously to modulators 12 and 14, respectively. Likewise, A3 and B3, and A4 and B4 may be different from one another, respectively, and may be sent simultaneously to modulators 12 and 14, respectively. The state of each apparent subpixel region in the final image, for example 50, is instantaneously the result of the state of each associated overlapping pixel of modulators 12 and 14. The instantaneous value of each final image subpixel will change rapidly as determined by the different data in both modulators in all subframes. The eye does not respond to these rapid changes, but rather averages these values over an entire full frame to a single smooth apparent value. Dividing the frame into four subframes provides sufficient degrees of freedom in the data to optimize the resultant value of each of the four overlapping apparent subpixels in the final image that are associated with each full pixel of each modulator somewhat independently, such that they most closely match the value of the associated pixel in the original high resolution input image. Other numbers of subframes may be used, for example, two, or three, or even more than four, and the final image quality may degrade or improve by so doing. In another example, optimized for three primary colors, such as red, blue and green, twelve subframe data components may be sent to each pixel of each modulator, four for each of the three primary colors. The subframe data components sent to the modulators may be determined by an algorithm implemented in computer 19.

FIG. 3 is a schematic view of one embodiment of a light modulator system 60 including one embodiment of six light modulators 62, 64, 66, 68, 70 and 72 which produce red, green and blue light without the use of a color wheel. In system 60, light modulators 62 and 64 may be positioned in series and diagonally offset from one another, similar to light modulators 12 and 14 shown in FIG. 1. Similarly, each modulator of pair of light modulators 66 and 68, and each modulator of pair of light modulators 70 and 72, may be positioned in series and diagonally offset from one another, similar to the light modulators 12 and 14 shown in FIG. 1. These three pairs of light modulators, 62 and 64, 66 and 68, and 70 and 72, may be positioned in parallel with one another along an optical path 74, wherein optical path 74 may be split into three parallel optical paths 74a, 74b and 74c. In this embodiment, pair of modulators 62 and 64 may modulate green light, pair of modulators 66 and 68 may modulate blue light and pair of modulators 70 and 72 may modulate red light. Accordingly, a color wheel may not be utilized in this embodiment, which may produce a full color spectrum image of light 76 on display 26.

In another embodiment, two pairs of modulators 62 and 64, and 66 and 68 may be positioned in parallel with one another wherein first pair of modulators 62 and 64 may modulate red light and second pair of modulators 66 and 68 may alternate between modulation of green light and blue light.

Other variations and modifications of the concepts described herein may be utilized and fall within the scope of the claims below.

I claim:
1. A light modulator apparatus, comprising:
   a first light modulator;
   a second light modulator diagonally offset from one another along an optical path and in series with said first light modulator wherein said first light modulator produces a first image, said second light modulator produces a second image, and said apparatus produces a final image wherein said first and second images are simultaneously overlaid on one another wherein said apparatus produces a projected image having a number of apparent pixels, each apparent pixel including four subpixels.

2. A light modulator apparatus, comprising:
a first light modulator;
a second light modulator diagonally offset from one another along an optical path and in series with said first light modulator, wherein said first and second light modulators each include a plurality of pixels, and wherein said second light modulator is diagonally offset from said first light modulator by one half of a pixel width in a horizontal direction and by one half of a pixel height in a vertical direction.

3. A light modulator apparatus, comprising:
a first light modulator;
a second light modulator diagonally offset from one another along an optical path and in series with said first light modulator, wherein said first light modulator defines a first image, said second light modulator defines a second image, and wherein said first and second images are overlaid on one another to define a projected image, said projected image having a number of apparent pixels greater than three times a number of pixels of said first and second light modulators.

4. The apparatus of claim 3 wherein said projected image has a number of apparent pixels substantially four times a number of pixels of said first and second light modulators.

5. The apparatus of claim 1 further comprising an illumination source.

6. The apparatus of claim 1 further comprising a projection lens.

7. A light modulator apparatus comprising:
a first light modulator;
a second light modulator diagonally offset from one another along an optical path and in series with said first light modulator;
a third light modulator;
a fourth light modulator diagonally offset from and in series along the optical path with said third modulator;
a fifth light modulator; and
a sixth light modulator diagonally offset from and in series with said fifth modulator,
wherein said fifth and sixth light modulators modulate blue light, said third and fourth light modulators modulate green light, and said first and second light modulators modulate red light.

8. The apparatus of claim 7 wherein said first and second light modulators are positioned in parallel to said third and fourth light modulators and in parallel to said fifth and sixth light modulators.

9. The light modulator apparatus of claim 2:
wherein a first subframe data is sent to said first light modulator and a second subframe data, different from said first subframe data, is sent to said second light modulator.

10. A light modulator apparatus, comprising:
a first light modulator;
a second light modulator diagonally offset from one another along an optical path and in series with said first light modulator wherein said first light modulator produces a first image, said second modulator produces a second image, and said apparatus produces a final image wherein said first and second images are simultaneously overlaid on one another and wherein said light modulator apparatus produces an image having an apparent number of pixels greater than three times a number of pixels of said first and second light modulators, with an absence of a mechanical gyration device.

11. The apparatus of claim 1 wherein a plurality of pixels of said first light modulator are positioned substantially adjacent one another and wherein a plurality of pixels of said second light modulator are positioned substantially adjacent one another.

12. The apparatus of claim 1 wherein said first and second light modulators both modulate a plurality of colors of light.

13. A light modulation system having an optical path, the system comprising:
a first pixel array;
a second pixel array positioned along the optical path and in series with and vertically and horizontally offset from said first pixel array; and
an image source that produces a digital image split into first and second subframe components different from one another, wherein said first subframe component is sent to said first pixel array and said second subframe component is sent to said second pixel array wherein said system produces a viewable image having a resolution substantially two times a resolution of said first pixel array and said second pixel array.

14. A light modulation system having an optical path, the system comprising:
a first pixel array;
a second pixel array positioned along the optical path and in series with and vertically and horizontally offset from said first pixel array, wherein said second pixel array is vertically offset from said first pixel array by substantially one half a pixel height, and is horizontally offset from said first pixel array by substantially one half a pixel width.

15. The system of claim 13 wherein said system produces a viewable image including said first subframe component from said first pixel array superimposed on said second subframe component from said second pixel array.

16. The system of claim 13 wherein said first and second pixel arrays each include a plurality of pixels positioned substantially adjacent each other so that said first and second pixel arrays each define a substantially continuous light imaging area.

17. A light modulation system having an optical path, the system comprising:
a first pixel array;
a second pixel array positioned along the optical path and in series with and vertically and horizontally offset from said first pixel array; and
an image source that produces a digital image split into first and second subframe components different from one another, wherein said first subframe component is sent to said first pixel array and said second subframe component is sent to said second pixel array wherein said system produces a viewable image having a number of apparent pixels greater than three times a number of pixels of said first pixel array and said second pixel array.

18. The system of claim 13 wherein said first and second pixel arrays are stationary during operation.

19. A light modulation system having an optical path, the system comprising:
 a first pixel array;
 a second pixel array positioned along the optical path and in series with and vertically and horizontally offset from said first pixel array; and
 an image source that produces a digital image split into first and second subframe components different from one another, wherein said first subframe component is sent to said first pixel array and said second subframe component is sent to said second pixel array wherein said system produces a viewable image having a number of pixels substantially equal to a number of pixels of said first pixel array and a number of pixels of said second pixel array, said pixels of said viewable image each having four subpixel image components.

20. A projector having an optical path, the projector comprising:
 a first light modulator having a first pixel array; and
 a second light modulator having a second pixel array positioned in series and optically offset along the optical path, wherein said second pixel array is vertically offset from said first pixel array by substantially one half a pixel height, and is horizontally offset from said first pixel array by substantially one half a pixel width, and
 wherein said first and second light modulators produce an image having an apparent number of pixels at least 3.5 times greater than an individual number of pixels of said first and second light modulators.

21. The projector of claim 20 wherein said first and second light modulators are stationary during operation.

22. The projector of claim 20 wherein said first and second light modulators are diagonally offset from one another.

23. The projector of claim 20 further comprising an illumination source and a projection lens system.

24. The projector of claim 20 wherein said first and second modulators are positioned in series along an optical path such that corresponding pixel elements of both modulators must be operational to produce said image.

25. A light modulator system having an optical path, the system comprising:
 a first pixel array including a plurality of pixels; and
 a second pixel array including a plurality of pixels, said second pixel array positioned in series with and misaligned with respect to said first pixel array along the optical path such that a corner of each of said plurality of pixels of said first pixel array is substantially centrally positioned with a corresponding pixel of said second pixel array.

26. The system of claim 25 wherein said first and second pixel arrays form a viewable image of pixels, substantially each viewable image pixel having four sub-pixel images therein.

27. The system of claim 25 wherein said misalignment comprises a diagonal offset of said second pixel array with respect to said first pixel array.

28. The system of claim 25 wherein each of said first and second pixel arrays are positioned on a silicon substrate.

29. The system of claim 26 wherein said first and second pixel arrays simultaneously each produce a separate image, and wherein said simultaneously produced separate images are combined to produce said viewable image.

30. A light modulation device having an optical path, the device comprising:
 first means for modulating an image;
 second means for modulating an image, said second means positioned in series with and offset along the optical path from said first means for modulating, wherein said first and second means each comprise an interference based light modulator wherein said first and second means for modulating produce a final image, and wherein said final image has a resolution substantially two times a resolution of said first and second means for modulating.

31. The device of claim 30 wherein said first means and said second means are stationary during operation.

32. The device of claim 30 further comprising means for producing said image and means for projecting said image.

33. The device of claim 30 wherein said second means is diagonally offset from said first means.

34. A light modulation device having an optical path, the device comprising:
 first means for modulating an image;
 second means for modulating an image, said second means positioned in series with and offset along the optical path from said first means for modulating, wherein said image modulated by said first means comprises a first subframe data and said image modulated by said second means comprises a second subframe data, wherein said first subframe data modulated by said first means and said second subframe data modulated by said second means are combined to produce a final image having an apparent number of pixels at least 3.5 times greater than a number of pixels of said first and second means.

35. A method of resolution enhancement, comprising:
 illuminating a first light modulator;
 modulating said illumination by said first light modulator to provide a first image;
 illuminating a second light modulator with said first image, said second light modulator being offset from an optical path of said first light modulator; and
 modulating said first image by said second light modulator to provide a second image wherein said second light modulator is diagonally offset from said first light modulator such that a corner of each of a plurality of pixels of said second light modulator is positioned substantially centrally with respect to a corresponding pixel of said first light modulator.

36. The method of claim 35 further comprising retaining said first and second light modulators stationary during light modulation.

37. A method of resolution enhancement, comprising:
 illuminating a first light modulator;
 modulating said illumination by said first light modulator to provide a first image;
 illuminating a second light modulator with said first image, said second light modulator being offset from an optical path of said first light modulator; and
 modulating said first image by said second light modulator to provide a second image wherein said second image has an apparent number of pixels at least 3.5 times greater than a number of pixels of each of said first and second light modulators.

* * * * *